(12) United States Patent
Agara et al.

(10) Patent No.: US 10,577,973 B2
(45) Date of Patent: Mar. 3, 2020

(54) SERVICE TUBE FOR A TURBINE ENGINE

(71) Applicant: General Electric Company, Schenectady, NY (US)

(72) Inventors: Karthik Agara, Karnataka (IN); John Jakomin, Cincinnati, OH (US); Steven Paul Femia, Cincinnati, OH (US); Vinodh Rajagopalan, Tamil Nadu (IN)

(73) Assignee: General Electric Company, Schenectady, NY (US)

( * ) Notice: Subject to any disclaimer, the term of this patent is extended or adjusted under 35 U.S.C. 154(b) by 287 days.

(21) Appl. No.: 15/432,177

(22) Filed: Feb. 14, 2017

(65) Prior Publication Data
US 2017/0321572 A1 Nov. 9, 2017

(30) Foreign Application Priority Data
Feb. 18, 2016 (IN) .............................. 201641005620

(51) Int. Cl.
| | | |
|---|---|---|
| *F01D 25/18* | (2006.01) | |
| *F01D 25/14* | (2006.01) | |
| *F02C 7/24* | (2006.01) | |
| *F01D 9/06* | (2006.01) | |

(52) U.S. Cl.
CPC ............. *F01D 25/18* (2013.01); *F01D 9/065* (2013.01); *F01D 25/145* (2013.01); *F02C 7/24* (2013.01); *F05D 2220/32* (2013.01); *F05D 2230/60* (2013.01); *F05D 2240/15* (2013.01); *F05D 2260/231* (2013.01)

(58) Field of Classification Search
CPC ........ F01D 25/18; F01D 25/145; F01D 9/065; F02C 7/24; F05D 2220/32; F05D 2230/60; F05D 2240/15; F05D 2260/231
See application file for complete search history.

(56) References Cited

U.S. PATENT DOCUMENTS

| | | | |
|---|---|---|---|
| 5,955,410 | A | 9/1999 | Dingess et al. |
| 6,001,426 | A | 12/1999 | Witherspoon et al. |
| 6,038,862 | A | 3/2000 | Melman et al. |
| 6,047,670 | A | 4/2000 | Stella et al. |
| 6,102,577 | A | 8/2000 | Tremaine |
| 6,125,624 | A | 10/2000 | Prociw |

(Continued)

FOREIGN PATENT DOCUMENTS

| | | |
|---|---|---|
| JP | 2007-051574 A | 3/2007 |
| JP | 2007051574 A1 | 3/2007 |

(Continued)

OTHER PUBLICATIONS

Extended European Search Report and Opinion issued in connection with corresponding EP Application No. 17156325.7 dated Jul. 19, 2017.

(Continued)

*Primary Examiner* — Michael R Mansen
*Assistant Examiner* — Robert T Reese
(74) *Attorney, Agent, or Firm* — McGarry Bair PC

(57) ABSTRACT

An apparatus and method of reducing operating temperatures of a gas turbine engine, exposed to a service tube assembly by utilizing a skirt and radially outer mount. The reduction in temperature exposure minimizes temperatures of the service tube during engine operation to reduce the incidence of oil coking or varnish.

28 Claims, 12 Drawing Sheets

(56) References Cited

U.S. PATENT DOCUMENTS

| | | | |
|---|---|---|---|
| 6,148,532 A | 11/2000 | Ellis | |
| 6,187,465 B1 | 2/2001 | Galloway | |
| 6,247,440 B1 | 6/2001 | Gron, Jr. | |
| RE37,300 E | 7/2001 | Nagato et al. | |
| 6,261,070 B1 | 7/2001 | Johnson | |
| 6,289,872 B1 | 9/2001 | Dardalis | |
| 6,298,651 B1 | 10/2001 | Iijima | |
| 6,329,633 B1 | 12/2001 | Lamm et al. | |
| 6,385,960 B1 | 5/2002 | Kress et al. | |
| 6,438,938 B1 | 8/2002 | Burkholder et al. | |
| 6,528,557 B2 | 3/2003 | Lin | |
| 6,584,763 B2 | 7/2003 | Lymons et al. | |
| 6,596,780 B2 | 7/2003 | Jahnke et al. | |
| 6,613,815 B2 | 9/2003 | Lin | |
| 6,648,931 B1 | 11/2003 | Rao | |
| 6,662,546 B1 | 12/2003 | Giffin, III et al. | |
| 6,694,772 B2 | 2/2004 | Inoue et al. | |
| 6,712,080 B1 | 3/2004 | Handschuh et al. | |
| 6,719,953 B2 | 4/2004 | Di Nicolantonio et al. | |
| 6,734,331 B2 | 5/2004 | Cirrito et al. | |
| 6,741,534 B1 | 5/2004 | Takahashi et al. | |
| 6,789,522 B2 | 9/2004 | Seymour | |
| 6,814,539 B2 | 11/2004 | Farnsworth et al. | |
| 6,818,034 B2 | 11/2004 | Anderson et al. | |
| 6,845,943 B2 | 1/2005 | Chambers et al. | |
| 6,857,600 B1 | 2/2005 | Walker et al. | |
| 6,862,888 B2 | 3/2005 | Akagi et al. | |
| 6,877,555 B2 | 4/2005 | Karanikas et al. | |
| 6,945,931 B2 | 9/2005 | Ogawa | |
| 6,994,156 B2 | 2/2006 | Kopko | |
| 7,032,386 B2 | 4/2006 | Mandai et al. | |
| 7,053,756 B2 | 5/2006 | Mollenkopf et al. | |
| 7,069,726 B2 | 7/2006 | Frutschi | |
| 7,117,675 B2 | 10/2006 | Kaplan et al. | |
| 7,203,084 B2 | 4/2007 | Lee et al. | |
| 7,252,095 B2 | 8/2007 | Watt | |
| 7,284,931 B2 | 10/2007 | Stratford | |
| 7,297,173 B2 | 11/2007 | Renwart et al. | |
| 7,320,172 B1 | 1/2008 | Kamiya | |
| 7,334,982 B2 | 2/2008 | Singh et al. | |
| 7,344,139 B2 | 3/2008 | Gaebler et al. | |
| 7,412,741 B2 | 8/2008 | Roney et al. | |
| 7,419,353 B2 | 9/2008 | Guemmer | |
| 7,424,360 B1 | 9/2008 | Munson, Jr. | |
| 7,441,850 B1 | 10/2008 | Walton et al. | |
| 7,445,421 B2 | 11/2008 | Sathianathan | |
| 7,452,392 B2 | 11/2008 | Nick et al. | |
| 7,464,552 B2 | 12/2008 | Sattinger | |
| 7,465,146 B2 | 12/2008 | Kennedy et al. | |
| 7,523,736 B2 | 4/2009 | Rammer et al. | |
| 7,526,847 B1 | 5/2009 | Arthur et al. | |
| 7,559,201 B2 | 7/2009 | Prociw et al. | |
| 7,565,793 B2 | 7/2009 | Shelby et al. | |
| 7,565,867 B2 | 7/2009 | Donnelly et al. | |
| 7,607,306 B2 | 10/2009 | Steyer et al. | |
| 7,614,381 B2 | 11/2009 | Hoff et al. | |
| 7,648,566 B2 | 1/2010 | Wei et al. | |
| 7,673,454 B2 | 3/2010 | Saito et al. | |
| 7,690,184 B2 | 4/2010 | Gauthier et al. | |
| 7,699,104 B2 | 4/2010 | Tsilevich | |
| 7,736,403 B2 | 6/2010 | Barnicki | |
| 7,746,313 B2 | 6/2010 | Goto et al. | |
| 7,751,411 B2 | 7/2010 | Cam et al. | |
| 7,776,208 B2 | 8/2010 | Guo | |
| 7,834,500 B2 | 11/2010 | Savant | |
| 7,867,310 B2 | 1/2011 | Baten | |
| 7,892,511 B2 | 2/2011 | Strait | |
| 7,900,872 B2 | 3/2011 | Sternberger | |
| 7,918,310 B1 | 4/2011 | Helgeson et al. | |
| 7,947,155 B1 | 5/2011 | Green et al. | |
| 7,964,090 B2 | 6/2011 | Iqbal | |
| 7,964,296 B2 | 6/2011 | Mikijelj | |
| 7,975,552 B2 | 7/2011 | Kurtz | |
| 8,007,729 B2 | 8/2011 | Liu et al. | |
| 8,037,690 B2 | 10/2011 | Morenko et al. | |
| 8,051,637 B2 | 11/2011 | Labrador | |
| 8,052,935 B2 | 11/2011 | Leininger et al. | |
| 8,127,786 B2 | 3/2012 | Emmons | |
| 8,128,078 B2 | 3/2012 | Ochiai et al. | |
| 8,182,771 B2 | 5/2012 | Frydman et al. | |
| 8,183,422 B2 | 5/2012 | Alegria et al. | |
| 8,277,522 B2 | 10/2012 | Jimeson et al. | |
| 8,306,373 B2 | 11/2012 | Xia et al. | |
| 8,328,504 B2 | 12/2012 | Russell | |
| 8,328,889 B2 | 12/2012 | Agrawal | |
| 8,341,934 B2 | 1/2013 | Chapkovich, III et al. | |
| 8,356,694 B2 | 1/2013 | Jones | |
| 8,387,354 B2 | 3/2013 | Chillar et al. | |
| 8,408,167 B2 | 4/2013 | Ko | |
| 8,459,407 B2 | 6/2013 | Jangili | |
| 8,511,111 B2 | 8/2013 | Lambert | |
| 8,529,646 B2 | 9/2013 | Eskin et al. | |
| 8,529,865 B2 | 9/2013 | Belt et al. | |
| 8,574,322 B2 | 11/2013 | Kelly | |
| 8,596,417 B2 | 12/2013 | Barrett et al. | |
| 8,616,834 B2 | 12/2013 | Knight, III et al. | |
| 8,641,802 B2 | 2/2014 | Koss et al. | |
| 8,650,878 B2 | 2/2014 | Mehra et al. | |
| 8,662,106 B2 | 3/2014 | Reumschussel et al. | |
| 8,662,160 B2 | 3/2014 | DeWitt et al. | |
| 8,676,436 B2 | 3/2014 | Raimarckers et al. | |
| 8,677,754 B2 | 3/2014 | Lueck et al. | |
| 8,702,381 B2 | 4/2014 | Alajbegovic et al. | |
| 8,713,776 B2 | 5/2014 | Herbold | |
| 8,714,119 B2 | 5/2014 | Pett, Jr. | |
| 8,733,104 B2 | 5/2014 | Kumar et al. | |
| 8,739,520 B2 | 6/2014 | Digele et al. | |
| 8,764,867 B2 | 7/2014 | Brannon | |
| 8,776,527 B1 | 7/2014 | Sokhey et al. | |
| 8,793,971 B2 | 8/2014 | Dyer et al. | |
| 2002/0120017 A1 | 8/2002 | Bohn | |
| 2003/0110778 A1* | 6/2003 | Karafillis | F01D 25/16 60/785 |
| 2004/0068981 A1 | 4/2004 | Siefker | |
| 2010/0034710 A1 | 2/2010 | McGehee | |
| 2010/0132374 A1* | 6/2010 | Manteiga | F01D 9/02 60/796 |
| 2010/0135777 A1* | 6/2010 | Manteiga | F01D 9/02 415/190 |
| 2010/0135786 A1* | 6/2010 | Manteiga | F01D 9/065 415/232 |
| 2011/0225964 A1 | 9/2011 | Welch, Jr. | |
| 2013/0306173 A1 | 11/2013 | Cavarello et al. | |
| 2014/0066324 A1 | 3/2014 | Hughes et al. | |
| 2014/0205447 A1 | 7/2014 | Patat et al. | |
| 2014/0286763 A1* | 9/2014 | Munshi | F02C 7/12 415/178 |
| 2015/0052872 A1 | 2/2015 | Zurmehly et al. | |
| 2017/0292449 A1* | 10/2017 | Agara | F02C 7/06 |

FOREIGN PATENT DOCUMENTS

| | | |
|---|---|---|
| WO | 2014/051658 A1 | 4/2014 |
| WO | 2014/114653 A2 | 7/2014 |

OTHER PUBLICATIONS

Machine Translation of First Office Action and Search issued in connection with corresponding CN Application No. 201710086145.1 dated May 3, 2018.

\* cited by examiner

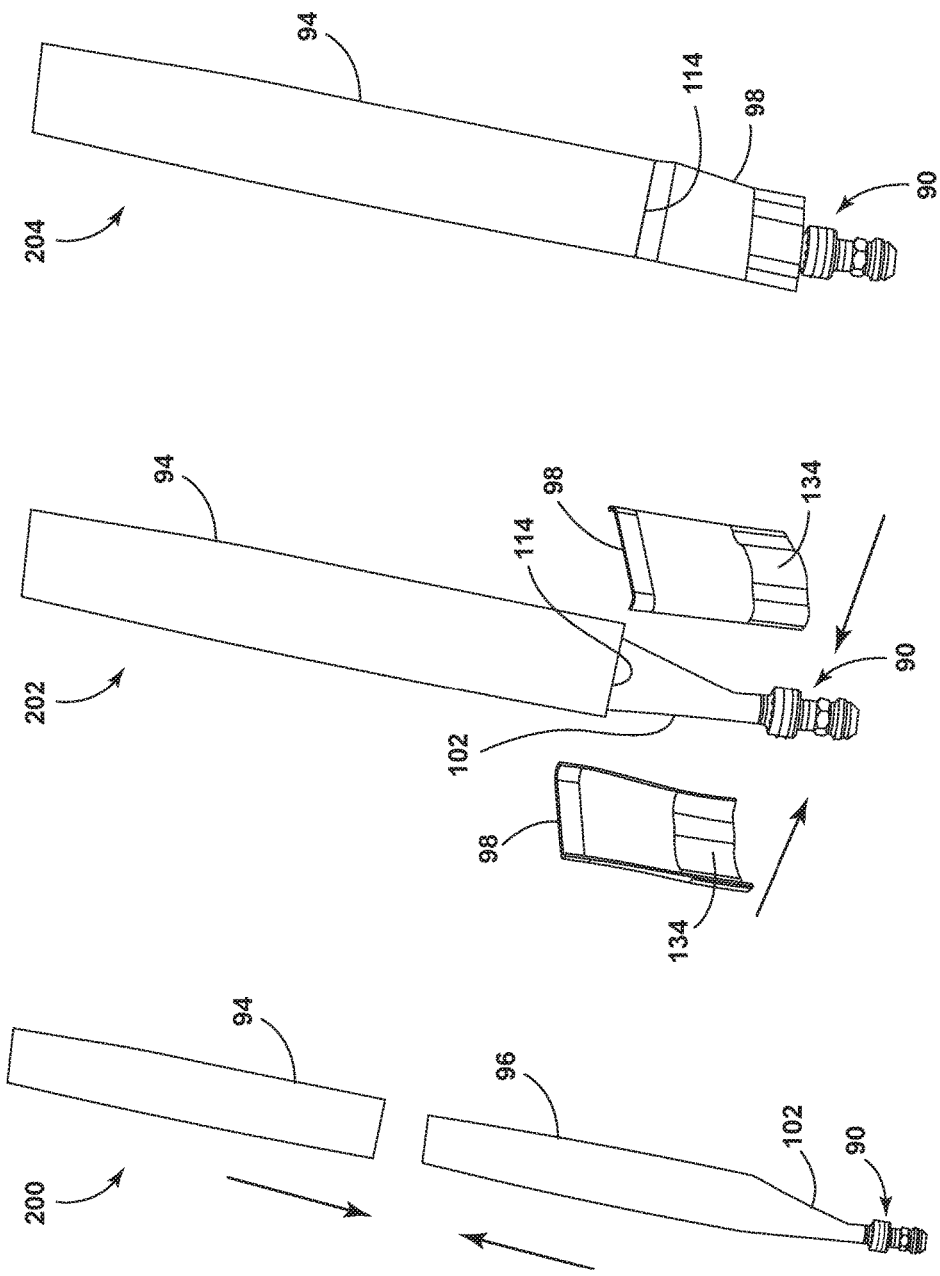

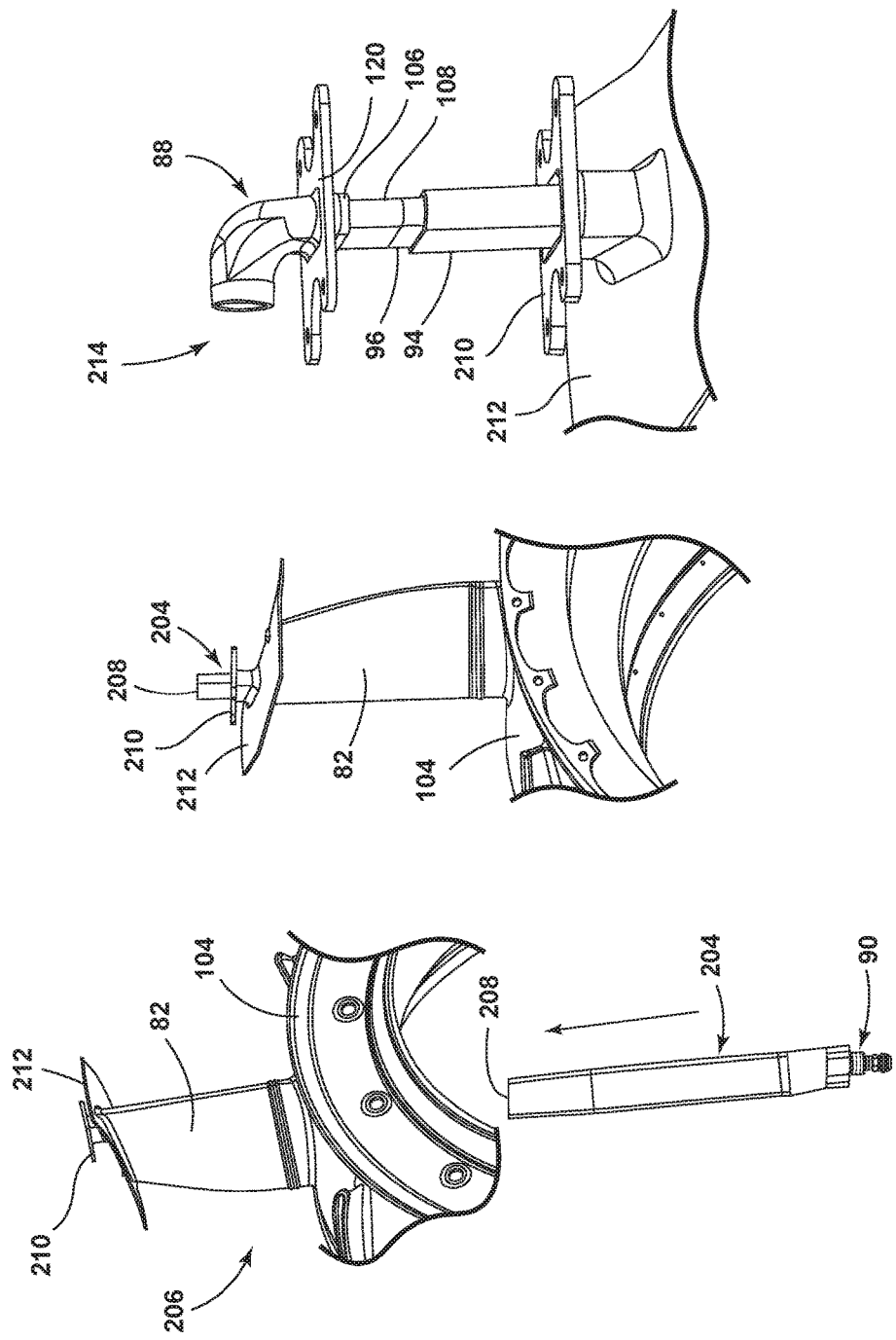

SERVICE TUBE FOR A TURBINE ENGINE

BACKGROUND OF THE INVENTION

Turbine engines, and particularly gas or combustion turbine engines, are rotary engines that extract energy from a flow of combusted gases passing through the engine in a series of compressor stages, which include pairs of rotating blades and stationary vanes, through a combustor, and then onto a multitude of turbine blades.

Gas turbine engines for aircraft often require lubrication of moving components. In order to keep these components lubricated, oil or an oil/air mixture is fed through the engine to these components. Service tubes fluidly couple different portions of the turbine engine or couple portions of the turbine engine to other parts of the aircraft. The service tubes can supply the oil or oil/air mixture to and/or from the turbine engine and between the different portions of the turbine engine. A heat shield can be used to protect a portion of the service tube from the hot temperatures of the turbine engine. Current heat shields do not protect the entire extent of the service tube.

Gas turbine engines have been used for land and nautical locomotion and power generation, but are most commonly used for aeronautical applications such as for airplanes, including helicopters. In airplanes, gas turbine engines are used for propulsion of the aircraft.

BRIEF DESCRIPTION OF THE INVENTION

In one aspect, the disclosure relates to a method of installing a heat shield about a service tube located within a strut for a gas turbine engine and having radially inner and outer fittings. The method comprises (1) sliding a heat shield sleeve over the service tube through a radially inner opening of the strut until a radially outer end of the heat shield abuts the outer fitting exteriorly of the strut; (2) securing the heat shield sleeve to the outer fitting to form a first sub assembly; (3) moving the first sub assembly radially inwardly until the outer fitting abuts a portion of the strut; and (4) securing the outer fitting to the portion of the strut.

In another aspect, the disclosure relates to a service tube assembly for a strut of a gas turbine engine comprising a service tube having an outer radial fitting and an inner radial fitting, and a heat shield extending from the outer radial fitting toward the inner radial fitting. The heat shield is secured to the outer radial fitting.

In yet another aspect, the disclosure relates to a heat shield for a service tube passing through a strut of a gas turbine engine. The heat shield comprises a sleeve sized to be slidably received over the service tube and a skirt having at least two portions sized to surround the service tube. The portions of the skirt are secured to each other and to an end of the sleeve.

BRIEF DESCRIPTION OF THE DRAWINGS

In the drawings:

FIGS. 11A-11H illustrate a method of installing the service tube assembly within the turbine rear frame of FIG. 2.

DESCRIPTION OF EMBODIMENTS OF THE INVENTION

The described embodiments of the present invention are directed to systems, methods, and other devices related to a service tube assembly in a turbine engine. For purposes of illustration, the present invention will be described with respect to an aircraft gas turbine engine. It will be understood, however, that the invention is not so limited and can have general applicability in non-aircraft applications, such as other mobile applications and non-mobile industrial, commercial, and residential applications. Furthermore, while the service tube assembly is described within a strut assembly, the present invention can have applications in any area where service tube heat shielding is required. For example, this invention can extend to service tubes passing through fairings.

Figure 1:
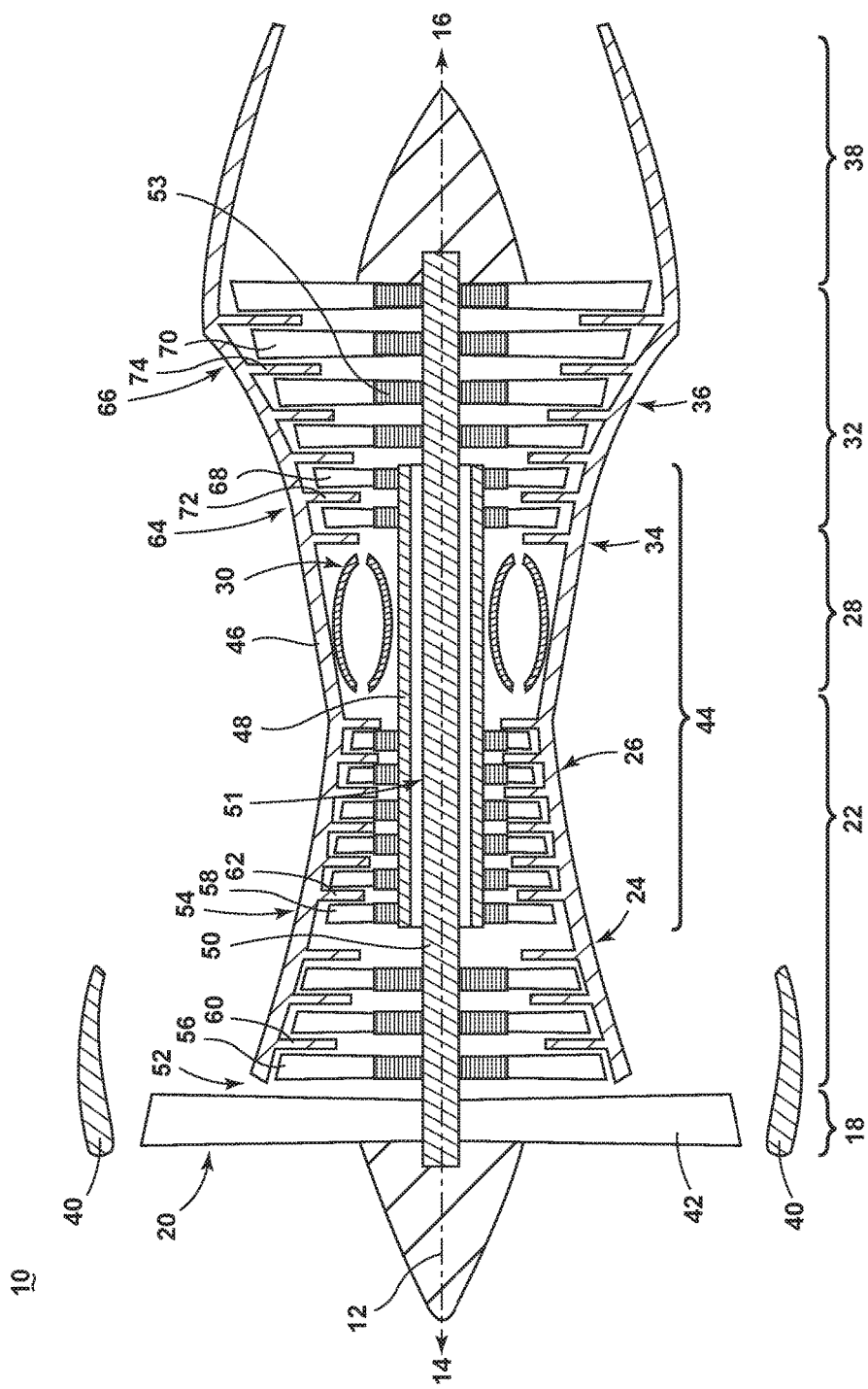
FIG. 1 is a schematic, sectional view of a gas turbine engine.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are also referred to individually or collectively as a rotor 51.

The LP compressor 24 and the HP compressor 26 respectively include a plurality of compressor stages 52, 54, in which a set of compressor blades 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the turbine can be mounted to a disk 53, which mounts to the corresponding one of the HP and LP spools 48, 50, with each stage having its own disk. The vanes 60, 62 are mounted to the core casing 46 in a circumferential arrangement about the rotor 51.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26.

Figure 2:
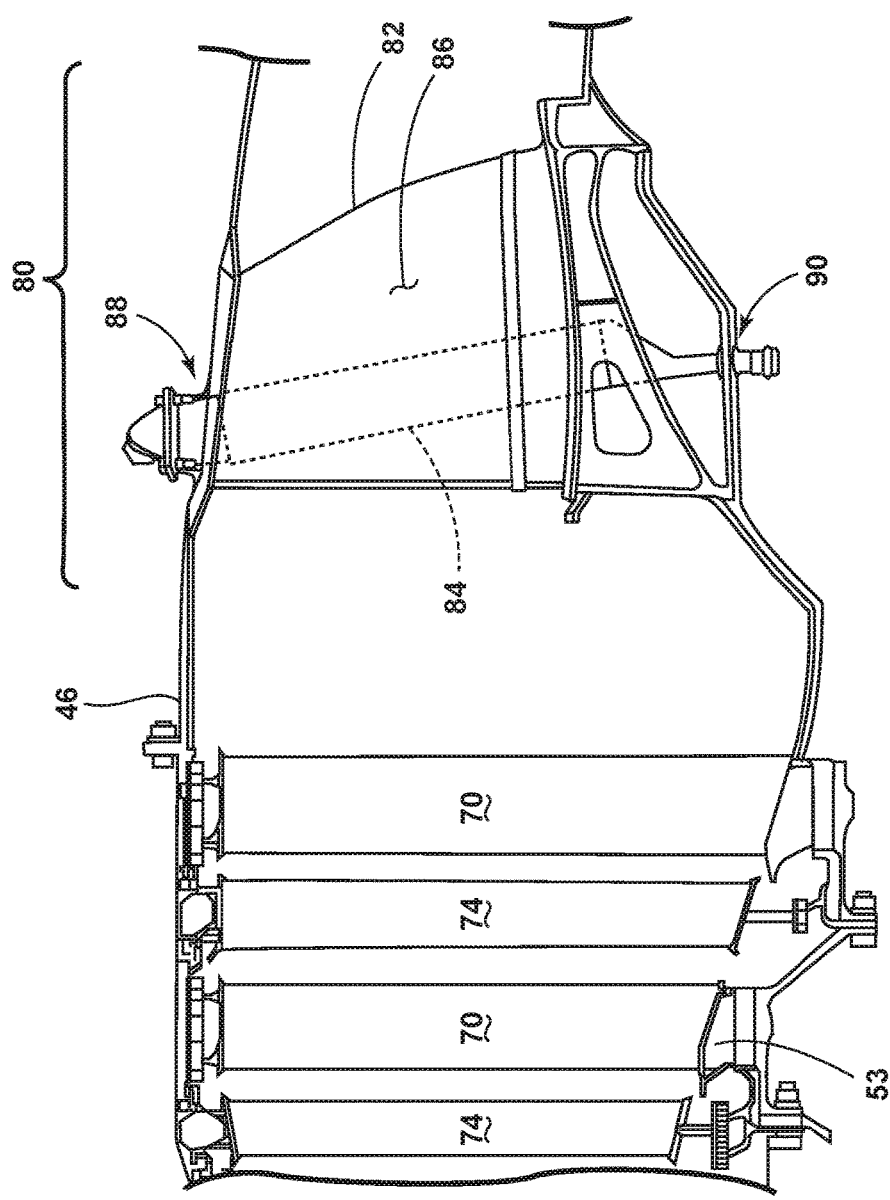
FIG. 2 is a cross-sectional view of a portion of a turbine rear frame and a low pressure turbine section.

Turning to FIG. 2, downstream of the LP turbine section 36 is a turbine rear frame 80 having a plurality of struts 82 disposed radially about the engine centerline 12. The struts 82 can be shaped or oriented to straighten and axially direct exhaust fluid from the LP turbine 36. A service tube assembly 84 can be disposed in a hollow interior 86 of the struts 82 for providing oil or an oil/air medium to necessary parts of the engine 10. The service tube assembly 84 mounts to the engine casing 46 or a nacelle at a radial outer fitting 88 and a radial inner fitting 90. The strut 82 and service tube assembly 84 disposed therein are downstream of the combustor 30 and are exposed to high temperatures during engine operation. The high temperatures can heat the service tube assembly 84 within the strut 82, heating the oil or oil/air medium moving through the service tube assembly 84. The high temperatures can cause varnish or coking of the oil, leaving a solid residue, which can undergo severe oxidation and thermal breakdown leading to coke deposits. The coke deposits can break and collect on different filters or engine passageways. The blocked passageways can cause engine damage or even shutdown. Therefore, it is desirable to minimize engine varnish or coking. It should be appreciated that the turbine rear frame 80 of FIG. 2 was selected for illustrative purposes and service tube assemblies 84 can be utilized in other portions of the engine such as the turbine center frame, fan hub frame, or turbine mid-frame, or any other tubing system providing oil or an oil/air mixture through the engine 10.

Figure 3:
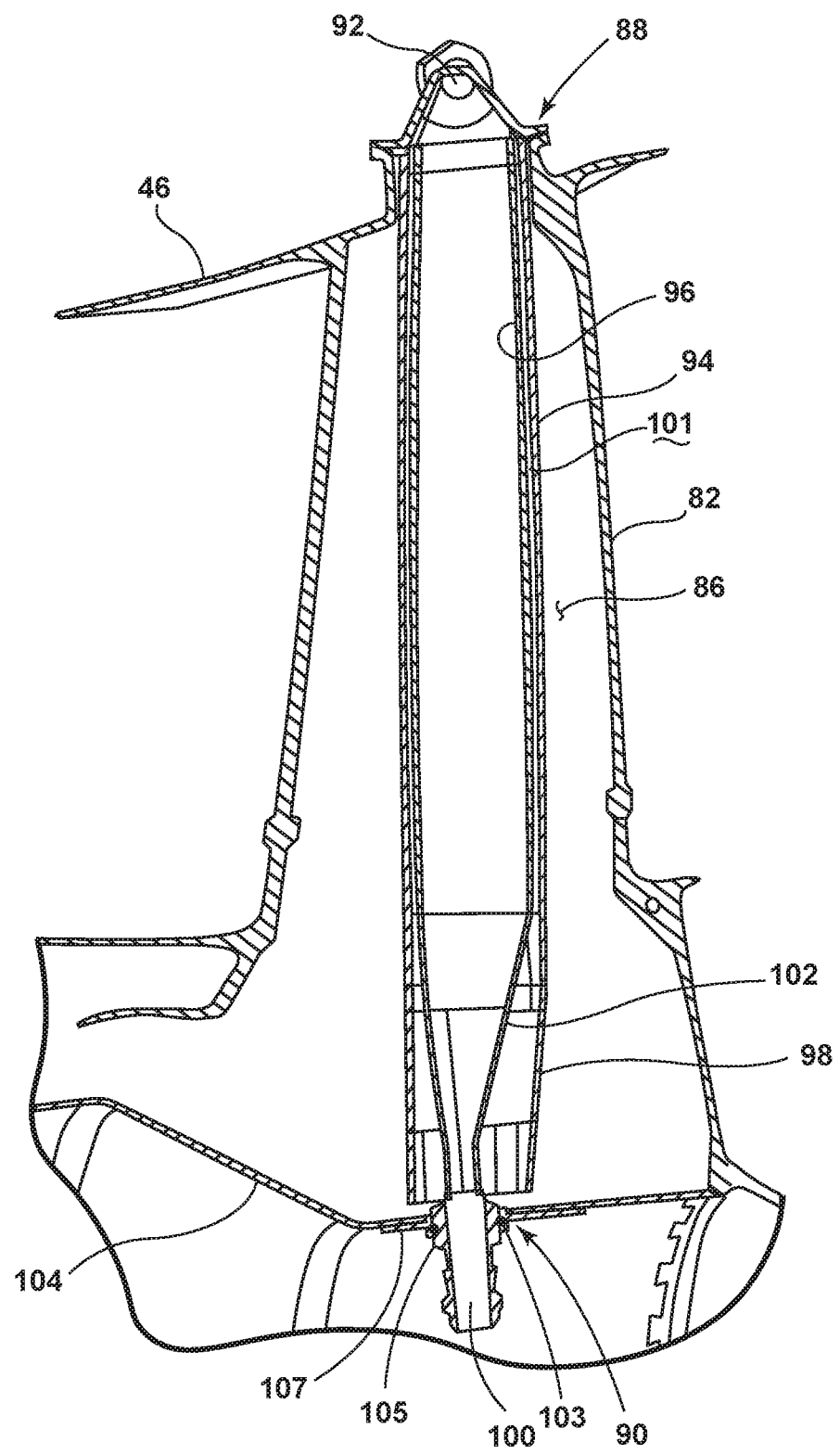
FIG. 3 is a cross-sectional view of the turbine rear frame of FIG. 2 having a strut with a service tube assembly.

FIG. 3 illustrates a cross-section of the strut 82 with the service tube assembly 84 extending radially through the strut 82. The service tube assembly 84 includes an outlet 92 in the radial outer fitting 88, and a heat shield sleeve 94, service tube 96, skirt 98, and inlet 100 in the radial inner fitting 90. The inlet 100 fluidly couples the service tube assembly 84 to a sump (not shown) for removal of oil or oil/air medium and the radial outer fitting 88 mounts both the heat shield sleeve 94 and the service tube 96 to the engine casing 46. The heat shield sleeve 94 is a heat shield element to reduce operational temperatures of the service tube 96. The heat shield sleeve 94 surrounds the service tube 96 and is spaced therefrom to form an air gap 101. The service tube 96 further includes a decreasing cross-sectional area 102 adjacent to the radial inner fitting 90, with the decreasing cross-sectional area 102 being surrounded by the skirt 98. The service tube 96 couples to a hub 104 at the radial inner fitting 90. The radial inner fitting 90 can include a tube collar 105 coupled to a retainer plate 107. The tube collar 105 can include a seal 103, such as a c-seal, sealing the radial inner fitting 90. The skirt 98 remains spaced from the hub 104 providing for flexion or thermal expansion of the service tube assembly 84 during engine operation. The service tube assembly 84 as illustrated in FIG. 3 is a scavenge tube for oil removal, and is selected for illustrative purposes only. The service tube assembly 84 can have similar applicability in any oil supply, scavenge, drain, or eductor tubes.

Figure 4:
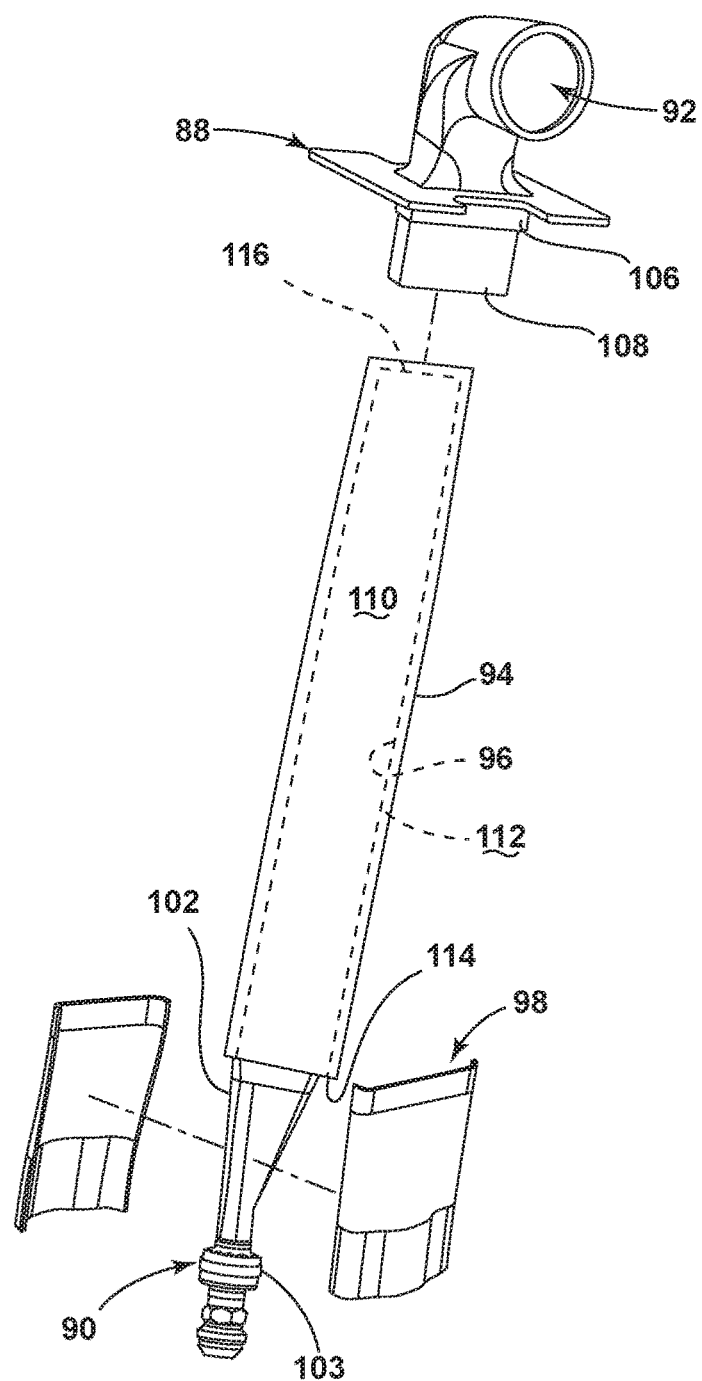
FIG. 4 is an exploded view of the service tube assembly of FIG. 3.

Looking at FIG. 4, an exploded view best illustrates the combination of the service tube assembly 84. The radial outer fitting 88 further includes a first lip 106 and a second lip 108 for mounting the heat shield sleeve 94 and the service tube 96, respectively, to the radial outer fitting 88. Thus, the outlet 92 can fluidly couple to the interior 110 of the service tube 96 separate the interior 112 of the heat shield sleeve 94. This is accomplished by coupling the first lip 106 to a sleeve outer radial end 114 and coupling the second lip 108 to a service tube radial outer end 116. The skirt 98 can be two-part, having two connectable portions that mount together at the radially inner end 114 of the heat shield sleeve 94 surrounding the decreasing cross-sectional area 102 of the service tube 96. The mounted skirt 98 and heat shield sleeve 94 can extend along the full of the service tube 96, or, alternatively, can extend along a portion of the service tube 96 terminating near the hub to maintain sufficient spacing to permit thermal growth.

Figure 5:
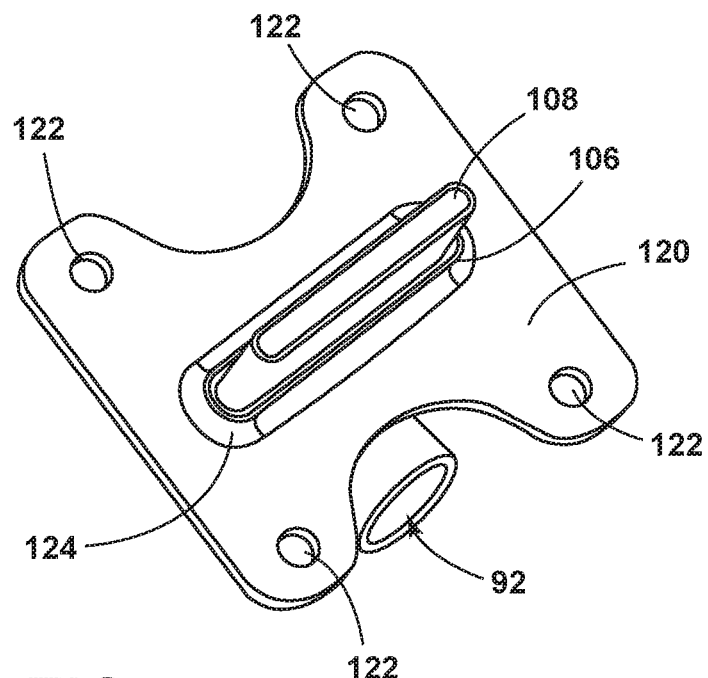
FIG. 5 is a bottom perspective view of an outer radial fitting for the service tube assembly of FIG. 3.

Looking at FIG. 5, the radial outer fitting 88 includes a mounting plate 120 disposed between the outlet 92 and the lips 106, 108 with a plurality of mounting apertures 122 for mounting the radial outer fitting 88. The first lip 106 surrounds the second lip 108 extending only partially from the mounting plate 120 having a filleted edge 124. The second lip 108 extends further from the mounting plate 120 relative to first lip 106, facilitating coupling of the service tube 96 and the heat shield sleeve 94 independent of one another.

Figure 6:
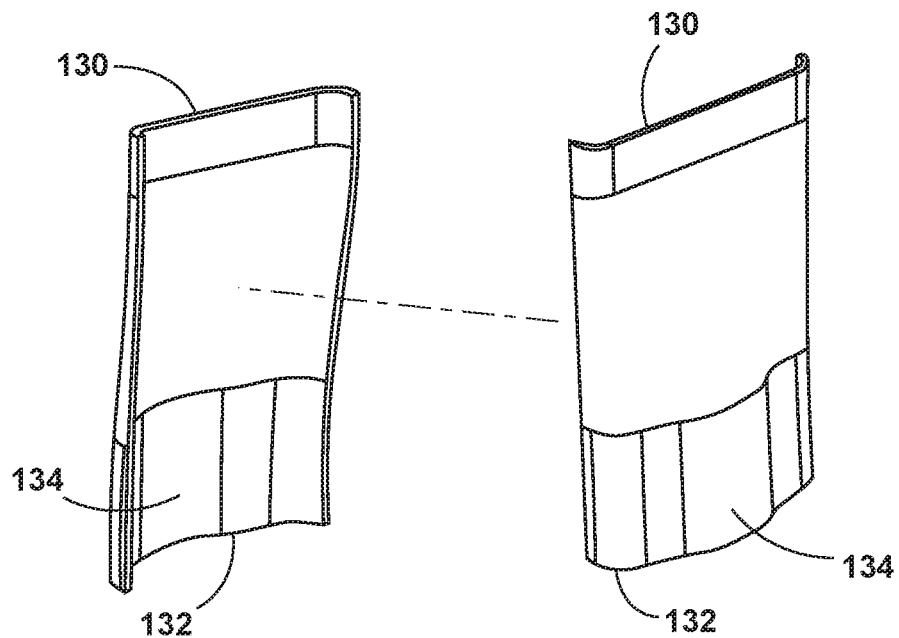
FIG. 6 is an exploded view of a skirt for the service tube assembly of FIG. 3.
Figure 7:
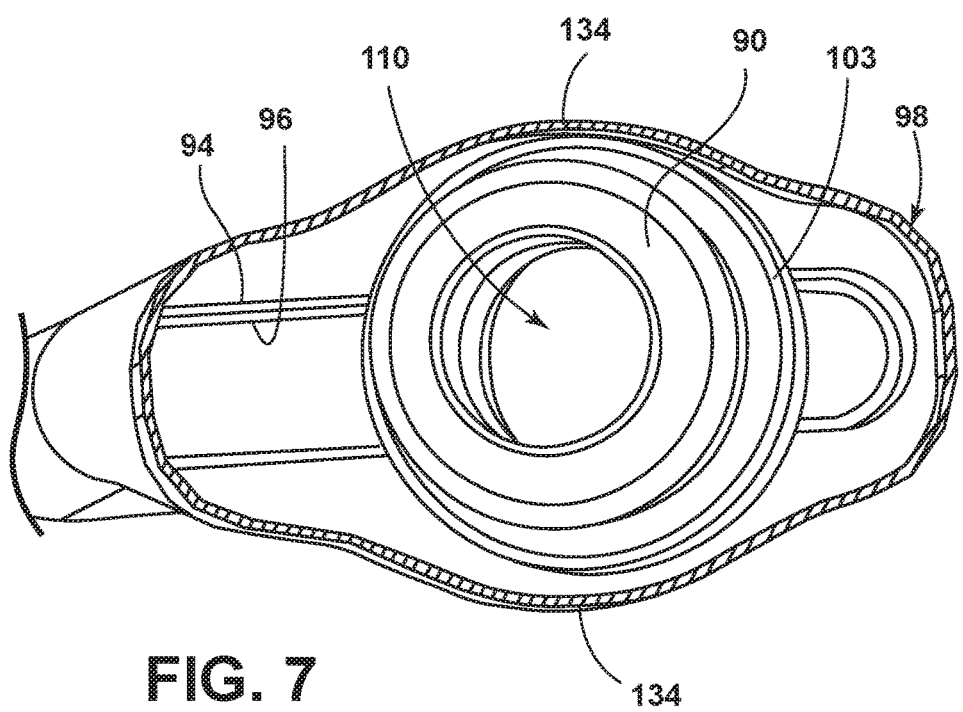
FIG. 7 is a bottom view of the service tube assembly of FIG. 3 illustrating the skirt at the radially inner fitting.

Looking at FIG. 6, the skirt 98 can be shaped to surround the radial inner fitting 90. Each half of the two-part skirt 98 can comprise an upper end 130 and a lower end 132. The upper end 130 of each half is complementary to half of the shape of the radially inner end 114 of the heat shield sleeve 94. The cross-sectional area of the skirt 98 increases moving toward the lower end 132, with each part having a flared radial inner portion 134 sized to receive the radial inner fitting 90. FIG. 7 shows a bottom view of the radial inner fitting 90 looking radially outwardly, illustrating the skirt 98 surrounding the radial inner fitting 90. The flared radial inner portion 134 is sized to surround the greatest cross-sectional width of the radial inner fitting 90, being slightly spaced therefrom.

Figure 8A:
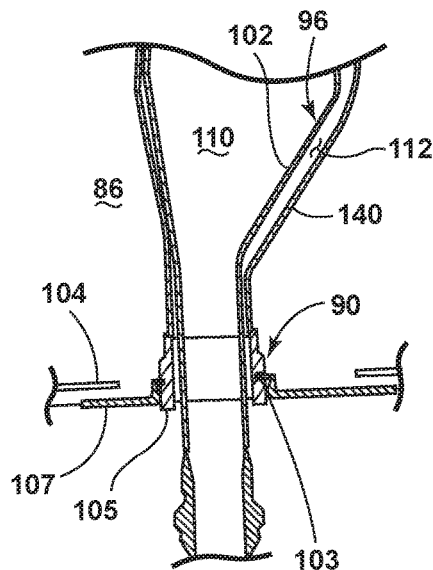
FIGS. 8A-8D illustrate four different skirts for surrounding the service tube assembly at the radially inner fitting.
Figure 8B:
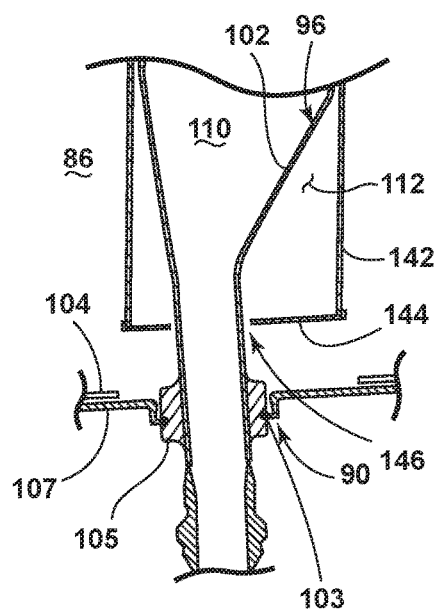
Figure 8C:
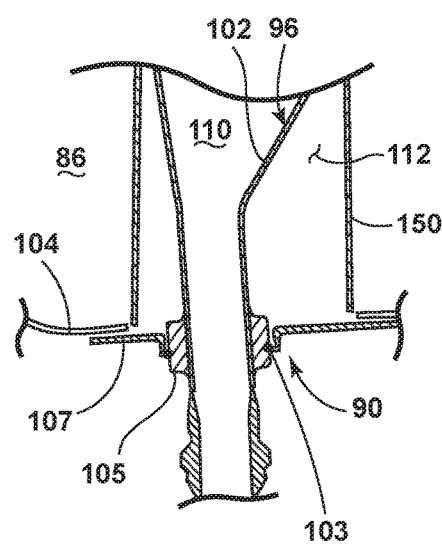
Figure 8D:
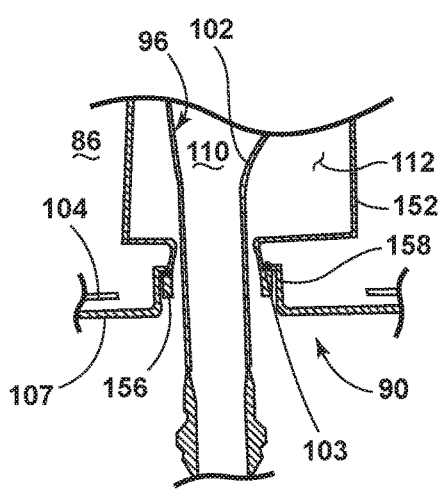

Looking at FIGS. 8A-8D, four alternative skirts 98 are illustrated for surrounding the decreasing cross-sectional area 102 of the service tube 96 at the radial inner fitting 90. FIG. 8A includes a fitted skirt 140. The fitted skirt 140 is shaped to follow the curvature of the decreasing cross-sectional area 102 of the service tube 96, coupling to a portion of the radial inner fitting 90. With the fitted skirt 140, the interior 112 of the heat shield sleeve is not in fluid communication with the interior 86 of the strut 82, being separated by the tube collar 105. FIG. 8B shows a straight skirt 142 having a skirt bottom 144 partially enclosing the interior 112 of the heat shield sleeve 94, having an service tube aperture 146 permitting the service tube 96 to extend through the straight skirt 142 and couple to the radial inner fitting 90. FIG. 8C shows a variation on the straight skirt 142 of FIG. 8B, illustrating a second straight skirt 150 without the skirt bottom 144. The second straight skirt 150 extends to adjacent the hub 104, being slightly spaced therefrom. FIG. 8D illustrates a tabbed skirt 152 having a skirt bottom 144 extending to an annular tab 156 for securing to the retainer plate 107 at an annular tab reception 158. With the tabbed skirt 152, the interior 112 of the heat shield sleeve 94 is not in fluid communication with the interior 86 of the strut 82. It should be appreciated that any of the skirts 98, 140, 142, 150, 152 disclosed herein can be the skirt portion of the service tube assembly 84.

Figure 9:
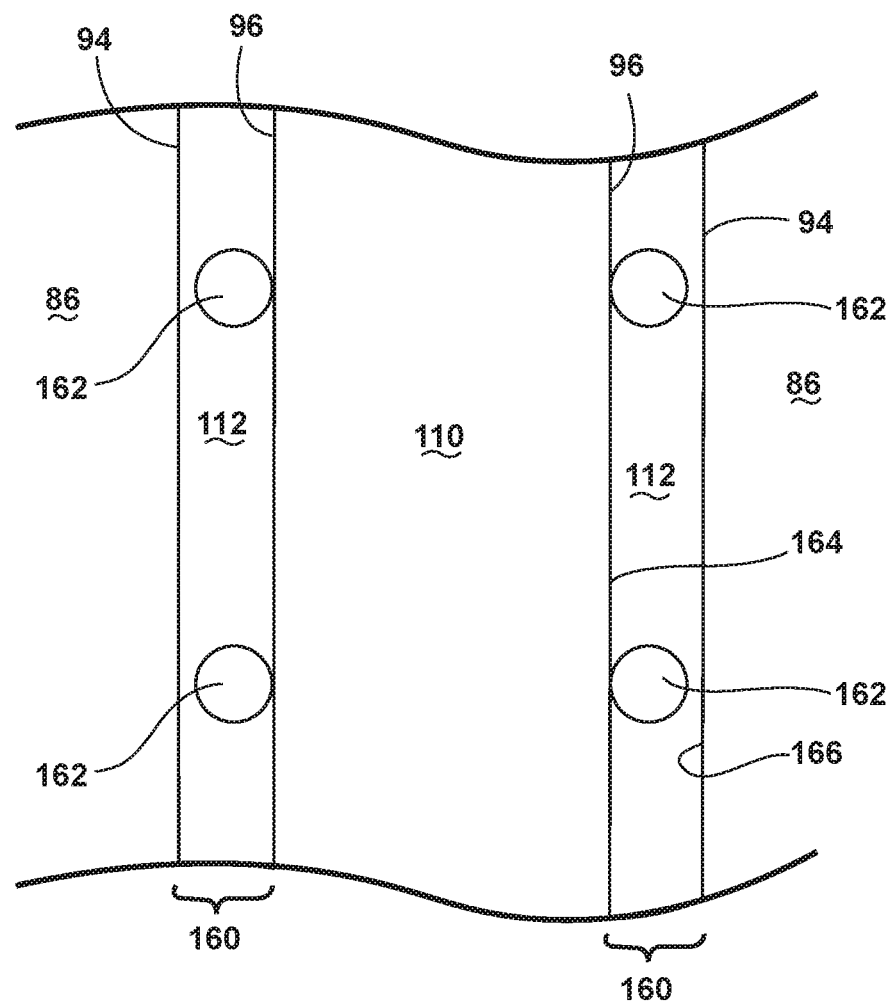
FIG. 9 illustrates a cross-sectional view having spacers between a service tube and a heat shield.

FIG. 9 illustrates a close-up view of the heat shield sleeve 94 surrounding and spaced from service tube 96 by the annular gap 101. The gap 101 can be sufficient such that air within the gap will be the primary mode of heat transfer between the heat shield sleeve 94 and the service tube 96. A plurality of spacers 162 can mount to the external surface 164 of the service tube 96 within the gap 101 or, alternatively, can mount to the internal surface 166 of the heat shield sleeve 94. However, it is beneficial to mount the spacers 162 to the service tube 96 as opposed to the heat shield 94 to minimize the amount of heat conducted from the heat shield The spacers 162 can be metal wire spacers, having an annular shape disposed around the annular gap 101, and can have a circular cross-section. Alternatively, the spacers 162 can be point spacers, including multiple discrete points mounted to the service tube 96 or the heat shield sleeve 94. The spacers 162 are useful in maintaining a consistent gap 101 between the service tube 96 and the heat shield sleeve 94 along the length of the service tube assembly 84. It should be appreciated that while the spacers 162 mount to either the heat shield 94 or the service tube 96, that they are spaced from the other of the heat shield 94 or the service tube 96 to prevent heat transfer through the spacers 162.

Figure 10B:
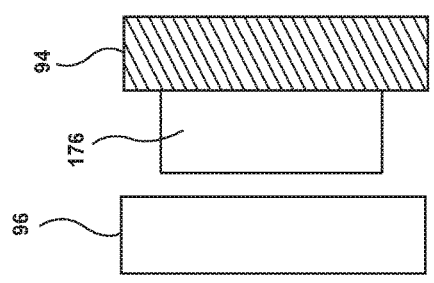
FIGS. 10A-10D illustrate four different types of spacers of FIG. 10.
Figure 10D:
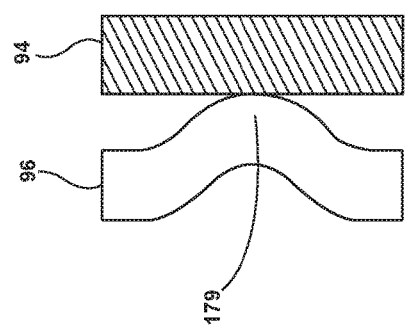
Figure 10A:
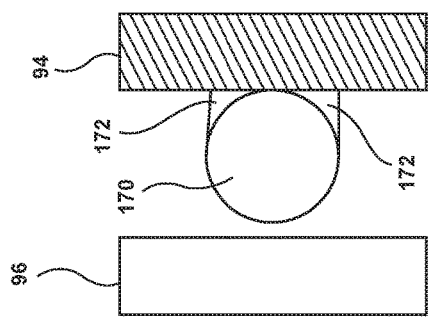
Figure 10C:
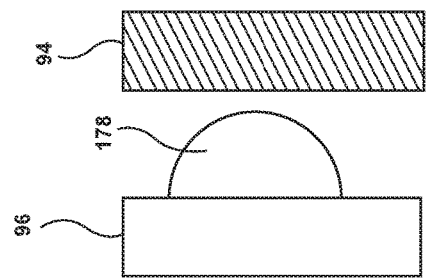

Looking at FIGS. 10A-10D, four alternative spacer cross-sections are illustrated, which can be utilized as the spacer 162 within the service tube assembly 84. Each alternative spacer can mount to either the service tube 96 or the heat shield sleeve 94, despite being shown in only one position. In FIG. 10A, a mounted point spacer 170, being annular and having a circular cross-section, can further include a mount support 172 for better securing the point spacer 170 to the heat shield 94. The mount support 172 provides additional security to the point spacer 170, which can otherwise move or separate from the heat shield sleeve 94 during operation or thermal expansion. FIG. 10B illustrates a rectangular spacer 176. The rectangular spacer 176 can be an annular spacer, or can include a plurality of discrete spacers mounted along the heat shield sleeve 94 in a patterned manner. Alternatively, the rectangular spacer can be square-shaped or any other quadrilateral, hemispherical, oval, or extrusion formed geometry. FIG. 10C illustrates a bump spacer 178. The bump spacer 178 can have a semi-circular cross-section and mount to the service tube 96, or alternatively, to the heat shield sleeve 94. FIG. 10D illustrates a dimpled spacer 179, which can be a concavity or depression in the service tube 96 or heat shield sleeve 94, being integral therewith. The dimpled spacer 179 can be annular around the service tube 96, or can be multiple discrete units disposed in a patterned manner about the service tube 96.

'Coke' is a solid residue, which is a time-at-temperature phenomenon, when oil undergoes severe oxidation, sulfidation, and/or thermal breakdown at extreme engine temperatures. At higher temperatures, the coke residue becomes harder and darker, which can create a condition where the coke can blocks filters and oil system passageways. Blockage of the filters and passageways can cause engine damage or even shutdown, which can occur mid-flight. During operation, oil coking can occur at higher temperatures exposed to the service tube assembly 84. Therefore, it is desirable to keep service tube assembly 84 temperatures minimized. It should be appreciated that as described herein, the service tube assembly 84 utilizing the skirt 98 and the heat shield sleeve 94 mounted to the radial outer fitting 88 can minimize the service tube assembly 84 temperatures to minimize or eliminate the occurrence of oil coking or varnish.

Figure 11H:
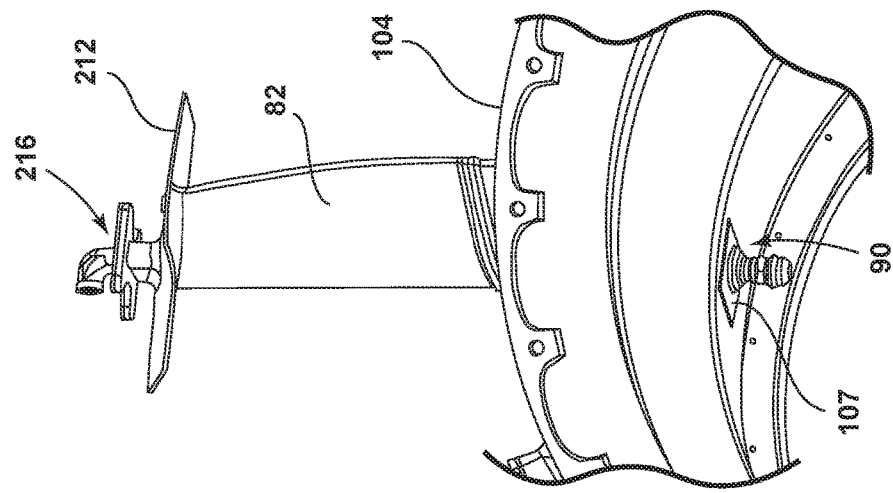

Looking at FIGS. 11A-11H, a method of installing a heat shield about a service tube, located within a strut for a gas turbine engine, is illustrated. It should be appreciated that the order of FIGS. 11A-11H is non-limiting, and that the order can change, vary, or steps as described can be combined. In FIG. 11A, illustrating step 200, the heat shield sleeve 94 slides over the service tube 96 until the radially inner end 114 of the heat shield sleeve 94 surrounds a portion of the decreasing cross-sectional area 102 of the service tube 96. In FIG. 11B, at step 202, the two part skirt 98 can be combined and mounted to the radially inner end 114 of the heat shield sleeve 94. The two part skirt 98 can couple together, such as by welding, and weld to the radially inner end 114 of the heat shield sleeve 94 to form a first assembly 204 illustrated in FIG. 11C.

Figure 11G:
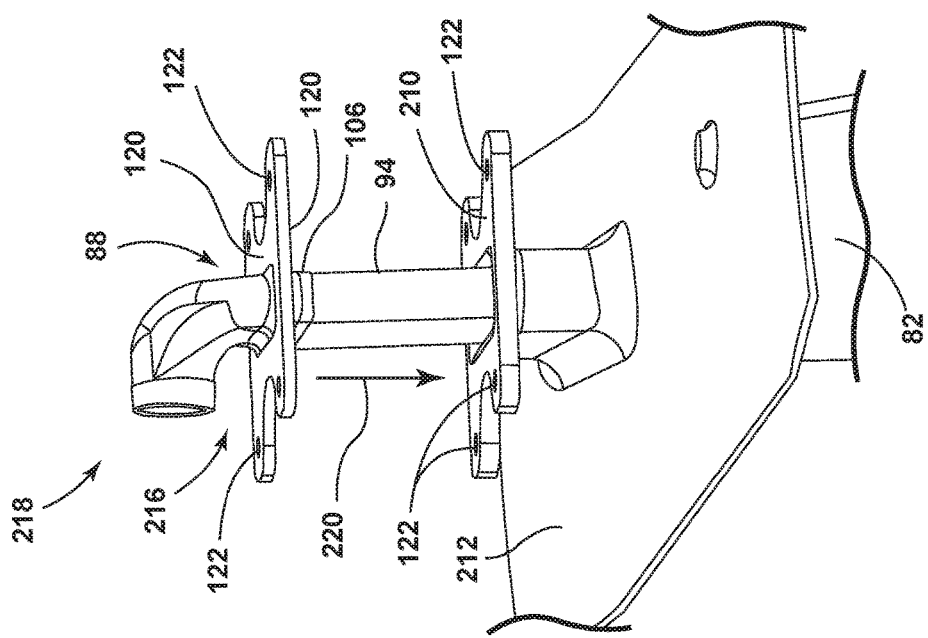

Turning to FIG. 11D, illustrating step 206, the first assembly 204 inserts into the strut 82 from radially inward moving radially outward. The first assembly 204 is inserted through the strut 82 until an upper end 208 of the first assembly 204 extends through a strut fitting 210 disposed on the radially outer surface 212 of the strut 82 as shown in FIG. 11E. Turning to FIG. 11F, at step 214 the radial outer fitting 88 first mounts to the service tube 96 at the second lip 108. In order to facilitate the mounting, the service tube 96 can be pushed upward to extend out of the heat shield sleeve 94. After mounting the service tube 96 to the second lip 108, the heat shield sleeve 94 can mount to the first lip 106, as shown in FIG. 11G as step 218. A first sub assembly 216 can include the combined heat shields sleeve 94, service tube 96, skirt 98, and the radial outer fitting 88, being disposed within the strut 82.

The first sub assembly 216 then moves radially inward, illustrated by arrow 220, until the mounting plate 120 of the radial outer fitting 88 abuts the strut fitting 210. The fittings 88, 210 are complementary to one another, and secures via the mounting apertures 122 utilizing a fastener such as a screw of bolt. Looking at FIG. 11H, the first sub assembly 216 couples to the strut 82 at the radial outer fitting 88. Underneath the hub 104, the radial inner fitting 90 can couple to the bottom of the inner casing with the retainer plate 107, completing installation of the service tube assembly 84. Additionally, the method of installation can include providing spacers 162, as shown in FIGS. 9-10C between the heat shield sleeve 94 and the service tube 96, while the spacers 162 can come preinstalled with the heat shield sleeve 94 or the service tube 96.

It should be appreciated that the geometric features including the heat shield sleeve 94, service tube 96, skirt 98, fittings 88, 90, and spacers 162 reduce operational temperatures by minimizing flow provided to the interior 112 between the service tube 96 and the heat shield sleeve 94. The reduced temperature along the service tube 96 minimizes or eliminates oil coking or varnish, minimizing or eliminating the operational problems associated therewith.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of installing a heat shield about a service tube located within a strut for a gas turbine engine and having radially inner and outer fittings, the method comprising:
   securing a heat shield skirt to a radially inner end of a heat shield sleeve with the heat shield skirt having a flared portion defining the radially inner end of the heat shield sleeve;
   sliding the heat shield sleeve over the service tube through a radially inner opening of the strut until a radially outer end of the heat shield sleeve abuts the outer fitting exteriorly of the strut;
   securing the heat shield sleeve to the outer fitting to form a first sub assembly;
   moving the first sub assembly radially inwardly until the outer fitting abuts a portion of the strut; and
   securing the outer fitting to the portion of the strut.

2. The method of claim 1 further comprising, prior to the sliding the heat shield sleeve, sliding the service tube relative to the heat shield sleeve and the strut until a radially outer end of the service tube abuts the outer fitting exteriorly of the strut, and securing the service tube to the outer fitting.

3. The method of claim 2 wherein securing the heat shield skirt to the radially inner end of the heat shield sleeve further includes placing opposing portions of the heat shield skirt about the service tube and securing the opposing portions to each other and to the radially inner end of the heat shield sleeve.

4. The method of claim 3 further comprising securing the radially inner fitting to a radially inner end of the service tube.

5. The method of claim 4 further comprising providing spacers between the heat shield sleeve and the service tube.

6. A service tube assembly for a strut of a gas turbine engine comprising:
   a service tube having an outer radial fitting and an inner radial fitting;
   a heat shield extending from the outer radial fitting toward the inner radial fitting, with a skirt having a flared portion defining a radially inner end of the heat shield; and
   a set of spacers provided between the heat shield and the service tube;
   wherein the heat shield is secured to the outer radial fitting.

7. The service tube assembly of claim 6 wherein the outer radial fitting has a first lip that is secured to an outer radial end of the service tube, and a second lip that is secured to an outer radial end of the heat shield.

8. The service tube assembly of claim 7 wherein the heat shield comprises a sleeve that is slidably received over the service tube and which defines the outer radial end of the heat shield.

9. The service tube assembly of claim 8 wherein the skirt has a radially outer end secured to the sleeve.

10. The service tube assembly of claim 9 wherein the skirt comprises at least two portions that are secured together and around the service tube.

11. The service tube assembly of claim 10 wherein the skirt is adjacent to the inner fitting.

12. The service tube assembly of claim 11 wherein the flared portion at the radial inner end is sized to receive the inner fitting.

13. The service tube assembly of claim 6 wherein the set of spacers are dimples formed in the service tube.

14. The service tube assembly of claim 6 wherein the heat shield comprises a sleeve that is slidably received over the service tube and which defines the outer radial fitting of the heat shield.

15. The service tube assembly of claim 6 wherein the skirt comprises at least two portions that are secured together and around the service tube.

16. The service tube assembly of claim 6 further comprising spacers between the heat shield and the service tube.

17. The service tube assembly of claim 16 wherein the spacers are dimples formed in the service tube.

18. The service tube assembly of claim 6 wherein the heat shield has the radial inner end at least adjacent the inner fitting.

19. The service tube assembly of claim 18 wherein the radial inner end of the heat shield forms a gap with at least a portion of the inner fitting.

20. The service tube assembly of claim 18 wherein the radial inner end of the heat shield abuts at least a portion of the inner fitting.

21. A heat shield for a service tube passing through a strut of a gas turbine engine, the heat shield comprising:
   a sleeve sized to be slidably received over the service tube; and
   a skirt having a least two portions sized to surround the service tube and forming a flared portion defining a radial inner edge of the sleeve;
   wherein the portions of the skirt are secured to each other and to an end of the sleeve.

22. The heat shield of claim 21 further comprising a hub wherein a combined length of the sleeve and the skirt is less than that of the service tube to define a gap between the skirt and the hub.

23. The heat shield of claim 21 wherein the skirt defines the flared portion.

24. The heat shield of claim 23 wherein the flared portion defines a radial inner end of the heat shield.

25. The heat shield of claim 21 further comprising spacers extending into an interior of the sleeve.

26. The heat shield of claim 25 wherein the spacers are point spacers.

27. The heat shield of claim 26 wherein the spacers are discrete.

28. The heat shield of claim 27 wherein the service tube comprises dimples forming the spacers.

* * * * *